United States Patent Office 3,409,460
Patented Nov. 5, 1968

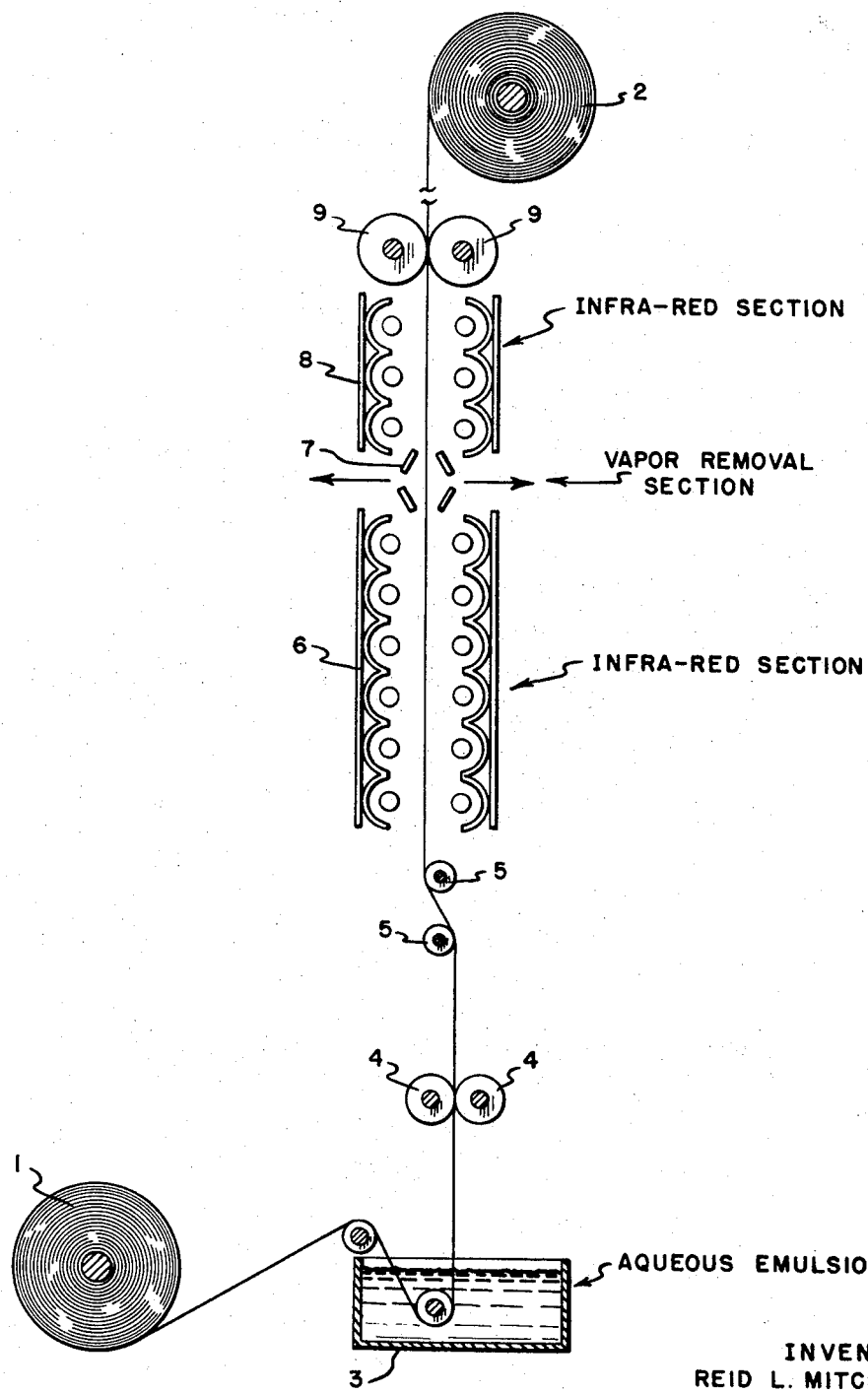

3,409,460
EMULSION COATING OF CELLULOSIC FILMS
Reid L. Mitchell and Charles F. Murphy, Morristown, and Douglas Allen, Parsippany, N.J., assignors to ITT Rayonier Incorporated, a corporation of Delaware
Continuation-in-part of applications Ser. No. 394,264, Sept. 3, 1964, and Ser. No. 516,507, Dec. 27, 1965.
This application Apr. 8, 1966, Ser. No. 541,261
2 Claims. (Cl. 117—93.31)

ABSTRACT OF THE DISCLOSURE

A hydrophobic resin coating is applied on a film of regenerated cellulose or hydroxyethyl cellulose by continuously applying on the film a coating of an aqueous emulsion of a thermoplastic hydrophobic resin, followed by a two-stage heating operation to flash off the water content of the emulsion coating and then to fuse and bond the residual resin particles to the film. In the present process, the aqueous emulsion contains up to 0.5% of a silicone rubber polymer as an anti-blocking agent, and advantageously contains a metal organic salt catalyst to consolidate the silicone rubber polymer.

---

This invention is a continuation-in-part of our patent application Ser. No. 394,264, filed Sept. 3, 1964, and Ser. No. 516,507, filed Dec. 27, 1965.

This invention relates to moisture proof type coating of transparent cellulosic films with hydrophobic resins, and has for its object the provision of an improved process for applying emulsion coatings of thermoplastic hydrophobic resins to cellulosic films which is efficient, economical and produces a superior product. The process of the invention is especially applicable to the emulsion coating of all types of cellulosic films, and comprises the heating of the applied emulsion with infrared radiation to first flash off water very rapidly before objectionable penetration occurs followed by additional heating with infrared radiation of the residual thermoplastic coating to fuse the resin and bond it to the cellulosic film.

The process of the invention is especially effective in the coating of alkali-soluble transparent films of hydroxyethylcellulose and also regenerated cellulose films, frequently called cellophane with emulsions of such thermoplastic compositions as the copolymers of vinylidene chloride with other monomers. A family of such copolymers is made and sold by the Dow Chemical Company under the trade name Saran in which vinylidene chloride is copolymerized with vinyl chloride, acrylonitrile or methyl methacrylate. Suitable emulsions of such thermoplastic resins usually contain from 10 to 50 percent by weight of the resin in water. Other suitable thermoplastic resins which may be applied to the films include polyethylene and polyamides together with some portion of organic solvent and surfactants which assist the emulsification in water, and in some cases, solvents such as toluene and/or isopropanol. The aqueous coating emulsions formulated from the Saran type copolymers used in this process may also include a very small amount of polyethyleneimine "anchoring agent" which improves the adhesion to the film. In an advantageous embodiment of the invention a small amount of an anti-blocking agent is added to the emulsion to minimize the tendency of the film to stick when the films are rolled up after the coating operation.

The coating of relatively rough surfaced hydrophilic paper webs with hydrophobic resins such as Saran aqueous emulsions is well known, but the attempts to extend this practice to the coating of cellophane and hydroxyethylcellulose have not been successful. The water component of the emulsion rapidly penetrates and swells the hydrophilic base film visibly resulting in imperfections and distortions when the coated film is dried in the conventional steam-heated air dryer system. As a result, transparent cellulosic films of this type are not coated with aqueous emulsions of resins in practical commercial operations.

This invention is based on the discovery that undistorted and streak-free films can be made provided the water of the applied aqueous emulsion is removed before it has been completely absorbed or penetrates too deeply into the base film. Also for good moisture barrier properties the coating of thermoplastic resin should be post-heated to a temperature within about ±20° C. of the fusion point of the resin, preferably at a temperature equal to or above said fusion point in order to fuse and bond the resin to the film and provide continuity of coating and good adhesion. The invention is based on the further discovery that the water of the emulsion can be flashed off very quickly with infrared radiation in the range of 3 to 4 microns before the water-sensitive base film can absorb any appreciable amount of water from the aqueous emulsion. Such absorption of water into the film causes it to swell initially then subsequently to shrink when dried causing much distortion, streaks and poor appearance. Following the removal of water, infrared radiation, preferably in the range of 5 to 7 microns, is applied on the residual resin coating. This latter specifically controlled action of radiant heat on the coating following water removal selectively fuses the remaining resin phase into a consolidated smooth film which is bonded to the base film.

Blocking is an inherent problem with Saran coatings because, as it is well known, Saran tends to stick and adhere to itself. Rather than dust on talc, colloidal glass particles or wax as is common to prevent blocking, we have found it uniquely advantageous to put an anti-blocking agent in the aqueous emulsion.

In a more complete embodiment of the invention we have found that it is feasible and beneficial, if not essential, to add or incorporate in the aqueous emulsion a special type of agent to minimize sticking or blocking of the films together as when in a roll or stack and prevent deterioration in the appearance and handling qualities of the film. An effective agent for this purpose is polyvinylpyrrolidone and preferably a silicone rubber polymer, for example, a product called "Syl-off 22" of the Dow Corning Corporation. The silicone rubber polymer has advantages in producing very effective anti-blocking with relatively very small amounts.

A polyvinylpyrrolidone suitable for this feature of the invention is a white powder having a molecular weight of about 10,000, a maximum unsaturation of 1 percent which being water soluble, is readily dissolved in the aqueous coating emulsion. This anti-blocking agent is added to the emulsion in a preferred amount varying from 1 to 10 percent based on the weight of the coating solids. The silicone rubber polymer may be added to the coating emulsion in a preferred amount less than 0.5 percent by weight based on the weight of the coating solids. In the latter case the reaction is preferably catalyzed by a metalorganic salt such as Catalyst XY-139 incorporated into the coating emulsion.

The process of the invention comprises a series of stages of treatment on a continuously moving cellulosic base film which produces a transparent film having on one or both surfaces a hydrophobic coating which is free of distortion or streaks, with an exceptionally flat and glossy surface that presents an effective moisture barrier and which may have good anti-blocking properties. The coating operation is less expensive and more efficient than the presently used processes, and provides a superior film.

The accompanying drawing illustrates diagrammatically an arrangement of apparatus for treating a continuously moving base film of indefinite length according to the invention. The base film, preferably hydroxyethylcellulose, having about four percent of substituted ethylene oxide from the roll 1, is continuously passed through the system and the coated film is wound into roll 2. The base film enters the tank 3 and is coated on both sides with the aqueous emulsion, advantageously a Saran emulsion of vinylidene chloride copolymerized with vinyl chloride. This aqueous emulsion may advantageously contain internal anti-blocking agents and or internal anchoring agents. Two contacting base films may be passed through the system in face-to-face contact to coat only one surface of each base film. The film or the films, as the case may be, passes between the doctor rolls 4 to remove excess emulsion and then over rolls 5 to smooth the applied emulsion. Each set of rolls 4 and 5 is power driven at a desired constant speed.

The coated film passes through the infrared section 6 and is heated by radiant energy, preferably at 3 to 4 microns. The residence time of the film should be less than four seconds from the coating of the base film with the aqueous emulsion to completion of the drying in the first infrared section 6. This rapid drying at about 550° C. (emission temperature of the radiating surface) flashes off most of the water and prevents any appreciable absorption of water into the base film. Substantial absorption of water into the base sheet causes distortion, and deformation resulting from swelling and subsequent shrinkage of the film in process. Film shrinks when dried, swells when wet primarily in thickness and in the transverse or width dimension. In section 7 the water vapor is vented to the atmosphere. The film then enters the infrared section 8 wherein a radiant energy, rather specifically tuned to the resin of the coating, is applied to fuse the resin and effect chemical bonding to the base film. It is preferred to use from 5 to 7 microns in this section. The resulting coated base film is transparent, substantially distortion-free, imperfection-free, streak-free, glossy and has good hydrophobic properties presenting an excellent barrier to transmission of water vapor. A base-film of hydroxyethylcellulose is more dimensionally stable than a viscose base film. On the other hand, it is also more hydrophilic than viscose which makes it difficult to coat with any aqueous media without distortion in ordinary systems. The two-stage infrared drying and fusion system of this invention properly controlled as it is to restrict penetration of the water into the base-film permits an excellent coating application never before possible in conventional systems.

The following are examples of the type of aqueous emulsion formulations which may be used in the invention:

Parts by weight

A. Copolymer of vinylidene chloride (93%) vinyl
chloride (7%) _____ 15.0
Water _____ 84.5
Polyoxyethylene-polyoxypropylene block copolymer
(surfactant) _____ 0.5
B. Copolymer of vinylidene chloride (88%) acrylonitrile (12%) _____ 20.0
Water _____ 79.0
Alkylaryl polyether derivative (surfactant) _____ 1.0
C. Copolymer of vinylidene chloride (95%) methyl
methacrylate (5%) _____ 15.0
Water _____ 84.7
Nonyl phenol polyglycol ether alcohol (surfactant) _____ 0.3
D. Polyethylene (A.C. Resin 626) _____ 40.0
Water _____ 59.5
Polyoxyethylene sorbitan monooleate (surfactant)
(pH adjusted to 7.5 to 9.0) _____ 0.5
E. Polyamide, type 6-6 resin _____ 31.0
Toluene _____ 20.0
Polyoxyethylene sorbitan monooleate (surfactant) _ 2.0
Isopropanol _____ 30.0
Water _____ 17.0

The following examples illustrate processes of the invention for coating base films with thermoplastic hydrophobic resins to give moisture proof characteristics:

EXAMPLE I

Hydroxyethylcellulose film with degree of substitution of 4 percent ethylene oxide and containing 7 percent moisture and 18 percent glycerine softener on a total weight basis was prepared in roll form on a conventional casting machine. The roll of film was then coated by quickly passing it through an aqueous emulsion of a copolymer of vinylidene chloride and acrylonitrile containing 15 percent copolymer by weight, to which had also been added ¼ percent by weight polyethyleneimine to act as an anchoring agent. The polyethyleneimine improves the bond between the hydrophilic hydroxyethylcellulose base film and the hydrophobic copolymer coating.

The coated base film was passed rapidly between driven metering rolls 4 which regulate the amount of coating material applied and then over driven smoothing rolls 5 which distribute the liquid emulsion uniformly over the film surface. The infrared section 6 was set to emit radiation at a controlled wave length of 3 to 4 microns to rapidly flash off the bulk of the water in the coating before it could penetrate the base film. To minimize the water penetration effect on the base hydroxyethylcellulose film after application of the emulsion, film speed and radiant energy output were adjusted so that the emission temperature in the path of the film reached about 550° C. This treatment period should be less than 4 seconds, preferably from 1 to 2 seconds. The upper infrared section 7 was set to radiate energy at 7 microns which is a range preferentially absorbed by the copolymer resin but to a much lesser extent by the hydroxyethylcellulose base film. This preferential heating of the thermoplastic copolymer after rapid removal of the water component fused and flattened the coating resin layer and resulted in a coated base film having unusually good appearance, gloss, moisture barrier properties and substantial freedom from visible coating irregularities.

Residual moisture in the coated dried film was controlled so that it equaled the 7 percent moisture in the original film, and the coated film then passed over chilled rolls to cool the thermoplastic coating and reduce its tackiness before it was wound in roll form for future use.

EXAMPLE II

A roll of hydroxyethylcellulose base film, containing 4 percent substituted ethylene oxide, of 0.00080 in. gauge thickness was dip coated with an aqueous emulsion containing 15 percent by weight of polyvinylidene chloride-polyvinyl chloride in 90/10 ratio and 0.10% catalyzed Syl-OFF 22, then led immediately into an infrared heating chamber radiating at a wave length of about 3 microns, exposed for 2 seconds to an emission temperature of about 700° C. (measured with a surface pyrometer) to flash off the major part of the moisture which was largely removed from the drying zone by use of a vacuum slice draw off. The sheet then proceeded through a second infrared bank radiating at a wave length of about 6 microns, exposed for 1 second, to fuse the coating particles and then passed through a circulating air section to cool the film before being wound up. The temperature in the second infrared section was adjusted to match the fusion temperature of the resin and for the case above was maintained at about 200° C. The film was then cooled quickly in the air chamber to about 40° C.

The coated film had excellent appearance, high surface gloss, was free of surface dimples and scratches and wound up at exactly the same width as the original roll, showing no shrinkage. Coating barrier and heat seal properties were excellent. The film could be pulled off the coated roll freely in a slitter operation and was adequately protected against blocking.

EXAMPLE III

Hydroxyethylcellulose film, containing approximately 4 percent substituted ethylene oxide, was coated with an aqueous emulsion of 15 percent by weight of Saran (copolymer of vinylidene chloride, 93 percent, and vinyl chloride 7 percent), water, 84.5 percent and surfactant, polyethylene-polyoxypropylene, 0.5 percent to which had been added 2 percent by weight of polyvinylpyrrolidone, based on the weight of the emulsion solids, as an anti-blocking agent. After passing over driven smoothing rolls 5, the film was dried rapidly during travel through a two stage infrared dryer; radiating at about 3 microns in the first section where the emission temperature was about 700° C. and radiating at about 6 microns in the second section 8, where the temperature was about 200° C. Chilled rollers 9 were used to cool the film to room temperature prior to windup into a roll.

Film appearance such as clarity and gloss and physical properties were excellent. The rolls were unwound easily after normal storage periods indicating absence of blocking.

Film coated under identical conditions, without polyvinylpyrrolidone in the coating emulsion, blocked (stuck) after a similar period of storage and could not be easily unwound.

EXAMPLE IV

A roll of hydroxyethylcellulose film with an approximate degree of substitution of 4 percent ethylene oxide was coated from an aqueous emulsion of a copolymer of vinylidene chloride and methyl methacrylate containing 20 percent copolymer by weight. The emulsion also contained 0.2 percent polyvinylpyrrolidone by weight to act as a release agent for preventing the finished rolls from becoming blocked and unusable.

The coating emulsion was regulated and distributed evenly on the film metering rolls 4 and smoothing rolls 5 respectively; after which the film was led immediately into an infrared dryer 6. The film was first exposed in the lower stage to controlled radiation of 3 to 4 microns and temperatures of 550° C. for rapid removal of water. The upper infrared section 8 was at a temperature of 150° C. for radiation energy at 7 microns which is preferentially absorbed by the copolymer resin to fuse and flatten the coating, leaving it free of irregularities. Total drying time was about 4 seconds. The film was then cooled quickly by passing it over chilled rollers 9 to room temperature before the windup stage where it was collected in roll 2.

Moisture proofing and heat sealing properties were excllent and film clarity and gloss were of unusually high quality. After storage the film was unwound without evidence of blocking. When the polyvinylpyrrolidone was omitted from the coating emulsion formula, blocking was prevalent.

EXAMPLE V

Hydroxyethylcellulose film, containing approximately 4 percent substituted ethylene oxide, was coated with an aqueous emulsion of 15 percent by weight of a copolymer of Saran (copolymer of vinylidene chloride, 93 percent and vinyl chloride 7 percent) water 84.5 percent and surfactant (polyoxyethylene-polyoxypropylene copolymer) 0.5 percent, to which had been added, based on the weight of the emulsion solids, 0.4 percent by weight of a silicone rubber polymer plus 0.08 percent of a metal organic salt catalyst, Catalyst XY–139, as an anti-blocking system based on the weight of the emulsion solids. After passing over driven smoothing rolls 5, the film was dried rapidly during travel through a two stage infrared dryer; radiating at about 3 microns in the first section where the emission temperature was about 700° C. and radiating at about 6 microns in the second section 8, where the temperature was about 300° C. Chilled rollers 9 were used to cool the film to room temperature prior to windup into a roll. Film appearance, such as clarity and gloss, and physical properties were excellent. The rolls were unwound easily after normal storage periods indicating absence of blocking.

EXAMPLE VI

A roll of hydroxyethylcellulose film with an approximate degree of substitution of 4 percent ethylene oxide by weight was coated from an aqueous emulsion of a copolymer of vinylidene chloride and methyl methacrylate containing 20 percent copolymer by weight. The emulsion also contained as an anti-blocking agent 0.02 percent of silicone rubber polymer, and as a catalyst 0.004 percent of Catalyst XY–139 on the weight of the emulsion solids.

The coating emulsion was regulated and distributed evenly on the film by metering rolls 4 and moothing rolls 5 respectively; after which the film was led immediately into an infrared dryer 6. The film was first exposed in the lower stage to controlled radiation of 3 to 4 microns and temperatures of 550° C. for rapid removal of water. The upper infrared section 8 was set at a temperature of 300° C. for radiation energy at 5 to 7 microns which is preferentially absorbed by the copolymer resin to fuse and flatten the coating, leaving it free of irregularities. Total drying time was about 4 seconds. The film was then cooled quickly by passing it over chilled rollers 9 to room temperature before the windup stage where it was collected in roll 2.

Moisture proofing and heat sealing properties were excellent and film clarity and gloss were of unusually high quality. After storage the film was unwound without evidence of blocking.

EXAMPLE VII

Regenerated cellulose film made by the viscose process was coated with an aqueous emulsion containing 25 percent by weight of a copolymer of vinylidene chloride 90% and acrylonitrile 10%; water 74.5 percent and surfactant (polyoxyethylene-polyoxypropylene) 0.5 percent; to which had been added, based on the weight of the emulsion solids 0.4 percent by weight of a silicone polymer plus 0.08 percent of a metal-organic salt catalyst (Catalyst XY–139 produced by the Dow-Corning Co.) as an anti-blocking system based on the weight of the emulsion solids. After passing over driven smoothing rolls, the film was dried rapidly during travel through a two-stage infrared dryer; radiating at about 3 microns peak wavelength in the first section where the surface temperature of the radiant heaters was about 700° C., and radiating at about 7 microns in the second section 8 where the temperature was about 150° C. Chilled rollers 9 were used to cool the film to room temperature prior to windup. After storage, the moistureproof film had excellent barrier properties and clarity, and could be unwound without blocking.

EXAMPLE VIII

Regenerated cellulose film made by the viscose process was coated with an aqueous emulsion containing 40 percent by weight polyethylene, 0.5 percent polyoxyethylene sorbitan monooleate surfactant, 0.1 percent by weight of polyethyleneimine, and 59.4 percent water to which was added an additional 1.0 percent by weight of polyvinylpyrrolidone, based on the weight of emulsion solids, as an anti-blocking agent. After passing over driven smoothing rolls 5 the film was dried rapidly during travel through the first stage of a two-stage infrared dryer, which was adjusted to an emission tempratture of 450° C. for radiation at about 4 microns; then further fused in a second dryer section radiating 5.0 micron energy at about 300° C. Chilled rollers were used to cool the film to room temperature prior to windup into a roll.

Clarity and gloss of the coated film were excellent. After storage the film was unwound with no blocking and successfully used in laminating operations with other films.

What we claim is:

1. In the process of applying a hydrophobic resin coating on a cellulosic film of regenerated cellulose or hydroxyl cellulose in which the film of indefinite length is continuously passed through stages of treatment comprising applying on at least one side of the film a uniform coating of an aqueous emulsion of a thermoplastic hydrophobic resin, promptly applying infrared radiation on the coating to flash off water before it can penetrate substantially into the film, and then applying on the residual resin specific energy infrared radiation to heat resin particles to a temperature to fuse and bond the resin to the film, the improvement which comprises incorporating in the aqueous emulsion as an anti-blocking agent up to 0.5% of silicone rubber polymer, based on the weight of the solids content of the coating emulsion.

2. In the process of claim 1 including in the emulsion a metal organic salt catalyst to consolidate the silicone rubber polymer.

References Cited

UNITED STATES PATENTS

| | | | |
|---|---|---|---|
| 2,618,575 | 11/1952 | Oswin | 117—145 X |
| 2,889,806 | 6/1959 | Conant | 117—119.6 X |
| 3,150,864 | 9/1964 | Fetner et al. | 34—4 X |

ALFRED L. LEAVITT, *Primary Examiner.*

JOHN H. NEWSOME, *Assistant Examiner.*

UNITED STATES PATENT OFFICE
CERTIFICATE OF CORRECTION

Patent No. 3,409,460                            November 5, 1968

Reid L. Mitchell et al.

It is certified that error appears in the above identified patent and that said Letters Patent are hereby corrected as shown below:

Column 5, line 37, after "film" insert -- by --; line 51, "excllent" should read -- excellent --; Column 6, line 16, "moothing" should read -- smoothing --; line 69, "temperatture" should read -- temperature --. Column 7, lines 5 and 6, "hydroxyl" should read -- hydroxy ethyl --.

Signed and sealed this 3rd day of March 1970.

(SEAL)
Attest:

Edward M. Fletcher, Jr.                        WILLIAM E. SCHUYLER, JR.
Attesting Officer                                    Commissioner of Patents